Nov. 17, 1942.    M. HELLER    2,302,316

COLLAR FASTENER

Filed Nov. 26, 1940

Inventor
Meyer Heller
by D. Goldstick
ATTY.

Patented Nov. 17, 1942

2,302,316

UNITED STATES PATENT OFFICE 2,302,316

COLLAR FASTENER

Meyer Heller, Toronto, Ontario, Canada

Application November 26, 1940, Serial No. 367,229

3 Claims. (Cl. 24—81)

This invention relates to a clasp or fastener and more particularly to a class of the latter commonly used to retain in proper position the flaps or ends of a soft collar.

One object of this invention is the provision of a fastener which will hold the ends of a collar spaced relatively to each other.

Another object is to provide a fastener which will securely grip the collar portions and which is releasable only by specific manipulation of its parts.

A further object is to provide a fastener in which the gripping means are hidden from view.

A further object is to produce such a fastener economically and of very simple construction.

A further object is to provide a fastener which will permit easy engagement and disengagement of the collar ends.

Further and other objects and advantages of this invention will appear in the description thereof contained in the drawing and in the claims forming part of this application.

Referring now to the drawing.

Like characters refer to like parts throughout the various views.

Figure 1:
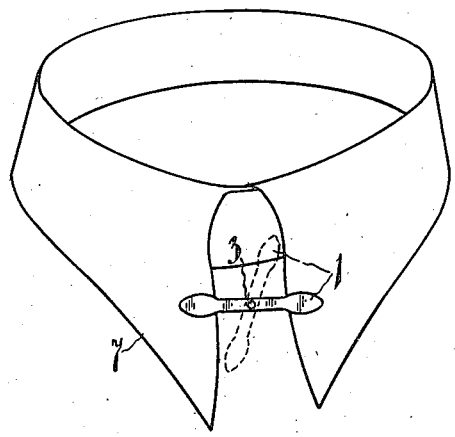
Fig. 1 is a view of the improved fastener as applied to the collar, and illustrates in dotted lines the position of the parts thereof upon actuation to disengage the same.
Figure 2:
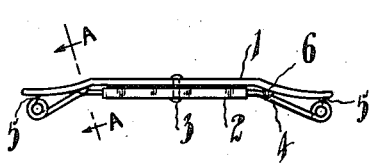
Fig. 2 is a plan view thereof.
Figure 3:
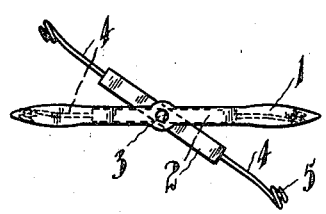
Fig. 3 is a front illustration in a released position.
Figure 4:
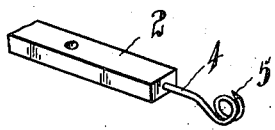
Fig. 4 is a perspective view of a portion of the rear member showing one species of construction.

A fastener constructed according to this invention and illustrated in Figs. 2, 3, and 4 comprises a front member 1 pivotally secured intermediate its ends by means of stud 3 to a rear member consisting of a central portion 2 and end portions 4. On the inner side of the front member there are provided two lugs 6 symmetrically spaced from the stud 3 having a central depression axial to such member and designed to produce a releasable snap lock against rotation of the two members relative to each other.

The front member 1 may be constructed of any rigid material; it may be of a configuration and design to impart a decorative effect thereto; the rear member constructed as shown in Fig. 2 has, as previously indicated, a central portion 2 of a rigid material such as metal and end portions 4 integral therewith but preferably of a resilient spring material such as steel wire or the like. The free ends of these end portions are off-set by being coiled and terminate in sharpened ends or prongs 5 protruding beyond the adjacent turns and pointing in a direction inwardly from the fastener ends and angular to the plane thereof.

To manipulate this fastener the two members are brought into registered alignment; this automatically locks the same against relative displacement through the agency of the resilient end portions being snapped into position to rest within the depressions of the lugs 6 and now the fastener may be easily applied to the collar by the mere relative sliding movement between the collar ends and the fastened ends.

It will be seen that when the fastener is thus applied, any manipulation seeking to draw the collar ends out of engagement will tend to force the sharpened terminii or prongs 5 to pierce the fabric of the collar and physically hold the same against disengagement. To disengage or remove this fastener, the operator need merely rotate the two members out of alignment thereby releasing the prongs from the fabric.

Figure 5:
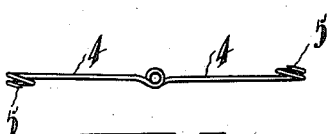
Fig. 5 is a plan view of a modified rear member.
Figure 6:
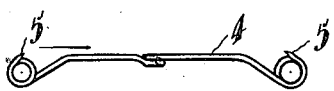
Fig. 6 is a view in elevation of the member shown in Fig. 5.
Figures 7, 8:
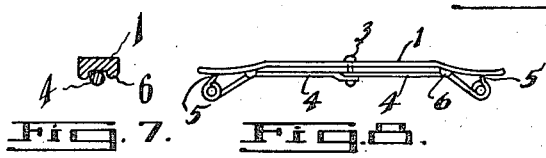
Fig. 7 is a sectional view on the line A—A of Fig. 2, showing the snap lock provided to hold the front and rear members in releasable registered relation.
Fig. 8 is a plan view similar to Fig. 2 including the modified member shown in Figs. 5 and 6.

A modification of the rear member of the fastener made according to my invention is shown in Figures 5 and 6. In this modification, the member is constructed wholly of resilient or spring material, a loop formed centrally therein provides pivotal accommodation for the stud and the end portions are formed and shaped as hereinbefore outlined.

It will be readily understood that the modification shown in Figures 5 and 6 are inordinately simple in construction and thereby achieve a tremendous saving in the manufacture of a commodity of this character.

Having thus described my invention, that which is particularly claimed is:

1. A collar fastener comprising a front member; a rear member having a rigid central portion and resilient or spring-like end portions bearing against the said front member and pivotally secured intermediate its ends to a central point therein; locking means comprising lugs disposed on the under face of the said front member on either side of the said pivotal joint, and adjacent thereto having central depressions axial therewith devised to accommodate therewithin shank portions of the said rear member thereby releasably locking such members in registered alignment; a prong carried on each end of the rear member protruding beyond adjacent portions and pointing in a direction inwardly from the fastener ends and angular to the long axis thereof; each such prong being designed to pierce the collar fabric of oppositely disposed collar flaps and hold same against relative displacement; means for releasing the said prongs from the collar fabric by rotatable movement of the front member out of registered alignment.

2. A collar fastener comprising a front member; a rear member of resilient spring material pivotally secured intermediate its ends to a central point in the said front member; locking means comprising lugs disposed on the inner face of the front member on either side of the pivotal point having central depressions axial therewith devised to accommodate therewithin shank portions of the said rear member thereby releasably locking such members in registered alignment; fabric piercing prongs disposed on the outer extremities of the rear member offset at an acute angle to the plane thereof with the points bearing against the said front member; each such prong being designed to pierce the collar fabric of oppositely disposed collar flaps and hold same against relative displacement except in a direction tending to bring the said flaps relatively closer to one another; means for releasing the said prongs from the collar fabric by rotatable movement of the front member out of registered alignment.

3. A collar fastener comprising a front member of rigid material; a rear member of resilient wire material having a central loop adapted to constitute a bearing for pivotally securing the same to the said front member and the outer extremities whereof are bent to form loops in a plane substantially at right angles to the loop previously referred to and the terminal points providing fabric piercing prongs protruding beyond adjacent portions and pointing in a direction inwardly from the fastener ends and angular to the long axis thereof and bearing against the said front member; means for releasably locking the said members in alignment comprising lugs disposed on the inner face of the front member on either side of the said pivotal point and adjacent thereto having central depressions axial therewith devised to accommodate therewithin shank portions of the said rear member; means for releasing the said prongs from the collar fabric by rotatable movement of the front member out of registered alignment.

MEYER HELLER.